(12) United States Patent
Murata

(10) Patent No.: US 12,130,513 B2
(45) Date of Patent: Oct. 29, 2024

(54) DISPLAY DEVICE FOR VEHICLE

(71) Applicant: YAZAKI CORPORATION, Tokyo (JP)

(72) Inventor: Naohisa Murata, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/616,172

(22) Filed: Mar. 26, 2024

(65) Prior Publication Data

US 2024/0329454 A1 Oct. 3, 2024

(30) Foreign Application Priority Data

Mar. 28, 2023 (JP) ................. 2023-051043

(51) Int. Cl.
G02F 1/1333 (2006.01)
G02B 27/01 (2006.01)
G02F 1/1335 (2006.01)

(52) U.S. Cl.
CPC ... *G02F 1/133382* (2013.01); *G02B 27/0101* (2013.01); *G02F 1/133514* (2013.01); *G02F 1/133553* (2013.01); *G02F 2203/02* (2013.01)

(58) Field of Classification Search
None
See application file for complete search history.

(56) References Cited

U.S. PATENT DOCUMENTS

| 9,423,615 | B2 | 8/2016 | Sato et al. |
| 11,714,279 | B2 | 8/2023 | Murata et al. |
| 2015/0098029 | A1* | 4/2015 | Sato ................. G02F 1/133555 349/11 |
| 2018/0246324 | A1* | 8/2018 | Hada ..................... G09G 3/20 |
| 2019/0346674 | A1* | 11/2019 | Miyake ................ B60K 35/00 |
| 2020/0241372 | A1* | 7/2020 | Yoshida .......... G02F 1/133382 |
| 2021/0289672 | A1* | 9/2021 | Ichikawa ........... G02B 27/0101 |
| 2022/0102963 | A1* | 3/2022 | Takahata ................ G01K 7/16 |
| 2022/0291505 | A1* | 9/2022 | Murata ................. B60K 35/00 |

FOREIGN PATENT DOCUMENTS

| JP | 2013-228442 A | 11/2013 |
| JP | 2017-3836 A | 1/2017 |
| JP | 2019-206232 A | 12/2019 |
| JP | 2020-52070 A | 4/2020 |
| JP | 2022-137325 A | 9/2022 |

* cited by examiner

Primary Examiner — Ryan Crockett
(74) Attorney, Agent, or Firm — KENEALY VAIDYA LLP

(57) ABSTRACT

A display device for a vehicle includes a housing that is provided in a vehicle, a TFT that is housed in the housing, an intermediate mirror, an infrared light absorbing member, and a thermistor. The intermediate mirror is housed in the housing, reflects, on a reflecting surface, display light that has been output from the TFT in such a way that the display light reaches a visual observation position of a driver of the vehicle, and transmits infrared light included in sunlight without reflecting the infrared light on the reflecting surface. The infrared light absorbing member is provided on a side of a rear face that is opposite to the reflecting surface of the intermediate mirror, and absorbs the infrared light that has been transmitted through the intermediate mirror. The thermistor is provided to the infrared light absorbing member, and detects the temperature of the infrared light absorbing member.

8 Claims, 4 Drawing Sheets

DISPLAY DEVICE FOR VEHICLE

CROSS-REFERENCE TO RELATED APPLICATION(S)

The present application claims priority to and incorporates by reference the entire contents of Japanese Patent Application No. 2023-051043 filed in Japan on Mar. 28, 2023.

BACKGROUND OF THE INVENTION

1. Field of the Invention

The present invention relates to a display device for a vehicle.

2. Description of the Related Art

Conventionally, as a display device for a vehicle, for example, Japanese Patent Application Laid-open No. 2020-52070 describes a head-up display device that projects an image onto a display region of a windshield to cause a driver of a vehicle to visually recognize a view onto which the image has been superimposed. This head-up display device includes an image display device that displays the image to be projected onto the display region, an optical sensor that detects an intensity of sunlight that is applied to the image display device, a shielding mechanism that shields the sunlight that enters the image display device in response to a shielding command, and a protection processing unit that issues the shielding command to the shielding mechanism to avoid an increase in temperature of the image display device, in a case where the intensity of the sunlight that has been detected by the optical sensor exceeds a predetermined threshold. Furthermore, Japanese Patent Application Laid-open No. 2013-228442, Japanese Patent Application Laid-open No. 2022-137325, Japanese Patent Application Laid-open No. 2017-3836, and Japanese Patent Application Laid-open No. 2019-206232 describe a display device for a vehicle that avoids an increase in temperature of a display device due to sunlight.

Incidentally, the head-up display device described in Japanese Patent Application Laid-open No. 2020-52070 described above detects the intensity of sunlight that is applied to the image display device by using the optical sensor, but a display device for a vehicle that detects the intensity of sunlight by using, for example, an infrared sensor is conceivable. This display device for the vehicle includes, for example, a liquid crystal display element, a back light that applies light to a rear face of the liquid crystal display element, a cold mirror that reflects display light that has been output from the liquid crystal display element, and transmits infrared light included in sunlight, and an infrared sensor that is provided to this cold mirror on a rear-face side, and detects the infrared light that has been transmitted through the cold mirror.

In the display device for the vehicle that is configured as described above, in a case where infrared light that has been transmitted through the cold mirror is detected by using the infrared sensor, it is requested that the infrared sensor be disposed in a portion where the infrared light condenses to be spaced apart from a rear face of the cold mirror, and therefore there is a possibility of a larger size of the device. On the other hand, in the display device for the vehicle, in a case where the infrared sensor is disposed to be close to the rear face of the cold mirror, it is requested that a plurality of infrared sensors be disposed, and therefore there is a possibility of an increase in the number of infrared sensors.

SUMMARY OF THE INVENTION

Accordingly, the present invention has been made in view of the above, and it is an object of the present invention to provide a display device for a vehicle that is capable of properly detecting an increase in temperature of a liquid crystal display element due to sunlight.

In order to achieve the above mentioned object, a display device for a vehicle according to one aspect of the present invention includes a housing that is provided in the vehicle; a liquid crystal display element that is housed in the housing; a mirror that is housed in the housing, reflects, on a reflecting surface, display light that has been output from the liquid crystal display element to cause the display light to reach a visual observation position of a driver of the vehicle, and transmits infrared light included in sunlight without reflecting the infrared light on the reflecting surface; an infrared light absorbing member that is provided on a side of a rear face of the mirror, the rear face being opposite to the reflecting surface, and absorbs the infrared light that has been transmitted through the mirror; and a temperature detector that is provided to the infrared light absorbing member, and detects a temperature of the infrared light absorbing member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment (an embodiment) of the present invention is described in detail with reference to the drawings. The content described in the embodiment described below is not restrictive of the present invention. Furthermore, the components described below include components that those skilled in the art could easily conceive of, or substantially the same components. Moreover, the configurations described below can be appropriately combined. Furthermore, various omissions, replacements, or modifications can be made to the configurations without departing from the gist of the present invention.

Figure 1:
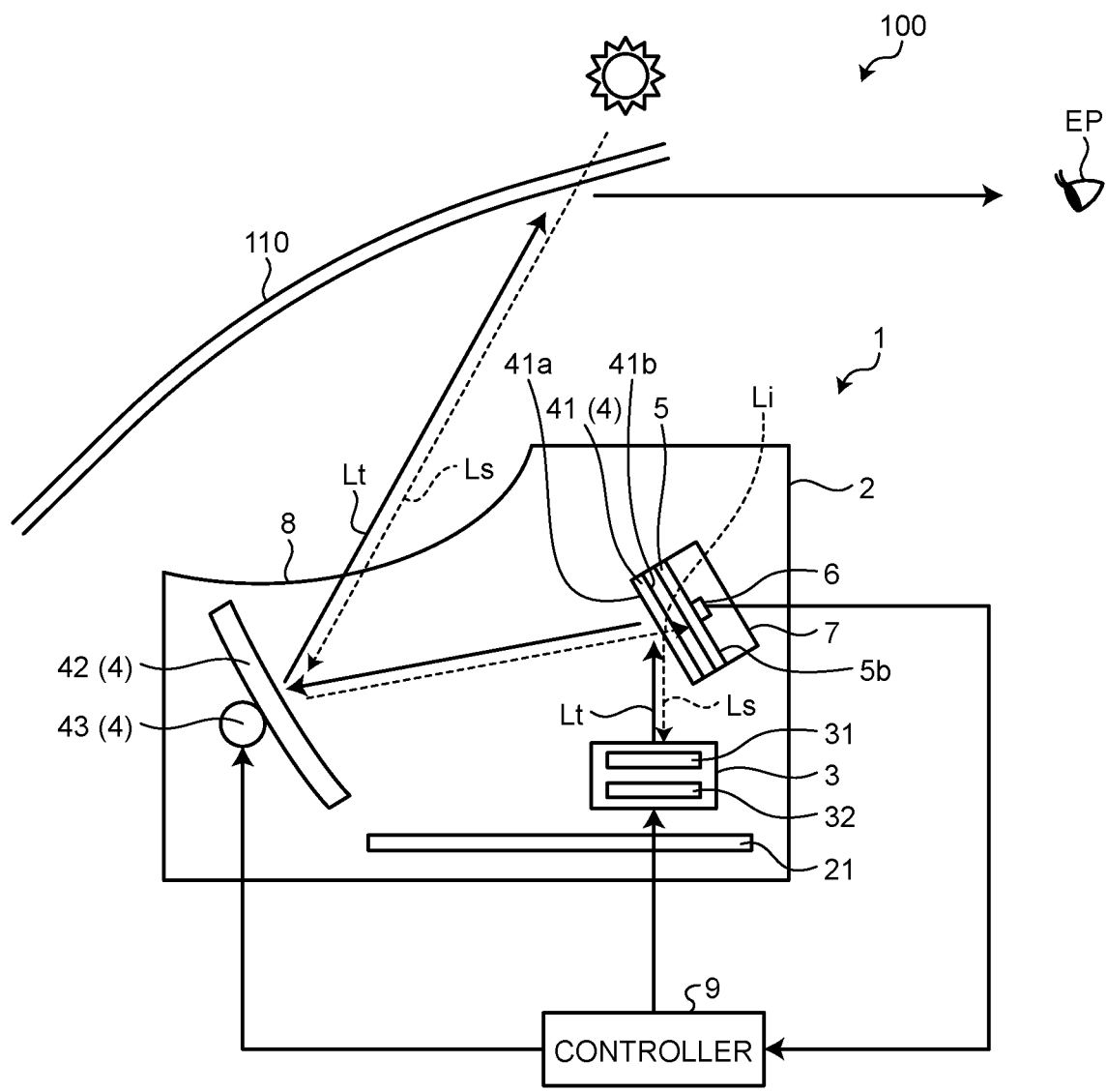
FIG. 1 is a diagram illustrating a configuration example of a display device for a vehicle according to an embodiment.

As illustrated in FIG. 1, a display device for a vehicle 1 according to the embodiment is a head-up display that is mounted on a vehicle 100 such as an automobile, and reflects display light Lt that has been output toward a windshield 110 that transmits light, toward a side of a visual observation position EP, by using the windshield 110 to display a virtual image. The display device for the vehicle 1 includes a housing 2, a display 3, an optical system 4, an infrared light absorbing member 5, a thermistor 6 serving as a temperature detector, a retaining member 7, a transparent cover 8, and a controller 9.

The housing 2 is housed below a dashboard of the vehicle 100. The housing 2 is formed in a box shape by using a shading material, and houses the display 3, the optical system 4, the infrared light absorbing member 5, and the thermistor 6, and these parts are fixed. The housing 2 includes an opening that is open upward in a vertical direction. This opening is closed by the transparent cover 8 that transmits light.

The display 3 outputs the display light Lt including an image. The display 3 is provided on a side of a bottom 21 of the housing 2, and includes a TFT 31 and a back light 32.

The TFT 31 is a display element that includes a liquid crystal that displays an image. The TFT 31 is, for example, a thin film transistor-liquid crystal display (TFT-LCD). The TFT 31 is a film-shaped member that includes a liquid crystal layer, a glass electrode, a polarizing plate, or the like. The back light 32 applies light to a rear face of the TFT 31, and therefore the TFT 31 outputs the display light Lt to the optical system 4.

The back light 32 applies light. The back light 32 includes, for example, a plurality of light-emitting elements that is constituted by an LED or the like. The back light 32 is provided to face the rear face of the TFT 31, and applies light to the rear face of the TFT 31. The back light 32 is connected to the controller 9, and applies light on the basis of a command signal that has been output from the controller 9.

The optical system 4 reflects, toward the windshield 110, the display light Lt that has been output from the display 3. The optical system 4 includes an intermediate mirror 41 and a final mirror 42 that serve as a mirror, and a mirror driving unit 43.

The intermediate mirror 41 is, for example, a planar mirror that includes a reflecting surface 41a having a planar shape and a rectangular shape. The intermediate mirror 41 is provided in a position closer to the TFT 31 than another mirror (the final mirror 42). Stated another way, the display light Lt that has been output from the TFT 31 directly enters the intermediate mirror 41 without interposing the other mirror. The intermediate mirror 41 reflects, on the reflecting surface 41a, the display light Lt that has been output from the TFT 31 in such a way that the display light Lt reaches the visual observation position EP of a driver of the vehicle 100. In this example, the intermediate mirror 41 totally reflects, toward the final mirror 42, the display light Lt that has been output from the TFT 31.

The final mirror 42 is, for example, a magnifying mirror that magnifies the display light Lt, and magnifies and reflects an image indicated by the display light Lt in such a way that an image indicated by the display light Lt after reflection is relatively larger than an image indicated by the display light Lt before reflection. The final mirror 42 totally reflects, toward the windshield 110, the display light Lt that has been output from the display 3 and has been reflected by the intermediate mirror 41, and causes the windshield 110 to reflect the display light Lt to a side of the visual observation position EP. The driver of the vehicle 100 visually recognizes a virtual image in accordance with the display light Lt reflected by the windshield 110.

The mirror driving unit 43 rotationally moves the final mirror 42. The mirror driving unit 43 is connected to the controller 9, and rotationally moves the final mirror 42 on the basis of a command signal that has been output from the controller 9 to change an orientation of a reflecting surface that reflects the display light Lt. This enables the controller 9 to display the virtual image in alignment with the visual observation position EP.

In the present embodiment, the intermediate mirror 41 described above is a cold mirror that reflects visual light, and transmits infrared light (infrared rays), and is formed, for example, by vapor-depositing a dielectric multilayer on a glass substrate. Here, in the display device for the vehicle 1, as illustrated in FIG. 1, sunlight Ls enters an inside of the housing 2 via the transparent cover 8 of the housing 2 in some cases. In these cases, the sunlight Ls that has entered via the transparent cover 8 of the housing 2 is reflected by the final mirror 42, and the sunlight Ls that has been reflected by the final mirror 42 enters the intermediate mirror 41. At this time, the intermediate mirror 41 is a cold mirror, and therefore the intermediate mirror 41 transmits infrared light L1 included in the sunlight Ls without reflecting the infrared light L1 on the reflecting surface 41a. The infrared light L1 that has been transmitted through the intermediate mirror 41 is absorbed by the infrared light absorbing member 5 described later.

The infrared light absorbing member 5 is a member that has an infrared light absorbing function. The infrared light absorbing member 5 can be formed by using, for example, a graphite sheet, a thermal sheet, or the like that has the infrared light absorbing function, but is not limited to this, and may be formed by using another member that has the infrared light absorbing function. The infrared light absorbing member 5 is formed by using a graphite sheet or a thermal sheet that is excellent in thermal conductivity, and therefore absorbed heat of the infrared light L1 can be quickly conducted to the entirety of the infrared light absorbing member 5. This enables the infrared light absorbing member 5 to be provided with a smaller number of thermistors 6 described later, and an increase in the number of parts and an increase in a cost can be avoided. The infrared light absorbing member 5 is formed in a rectangular shape, and is formed to have a size that is similar to a size of the intermediate mirror 41. The infrared light absorbing member 5 is provided on a side of a rear face 41b that is opposite to the reflecting surface 41a of the intermediate mirror 41, and absorbs the infrared light L1 that has been transmitted through the intermediate mirror 41. The infrared light absorbing member 5 is provided to the intermediate mirror 41, and therefore the infrared light L1 can be absorbed in a state where the infrared light L1 included in the sunlight Ls further condenses, in comparison with a case where the infrared light absorbing member 5 is provided to the final mirror 42. By doing this, the display device for the vehicle 1 detects the temperature of the infrared light absorbing member 5 that absorbs the infrared light L1 that has further condensed, and therefore an increase in temperature of the TFT 31 can be properly detected.

The thermistor 6 is a temperature sensor that detects temperature. The thermistor 6 is provided to the infrared light absorbing member 5, and in this example, the thermistor 6 is provided to be in contact with a reverse face 5b that is opposite to a side of the intermediate mirror 41 in the infrared light absorbing member 5. Here, a single thermistor 6 is provided in a center of the reverse face 5b of the infrared light absorbing member 5 that is formed in a rectangular shape. The infrared light absorbing member 5 is formed by using a graphite sheet or the like that is excellent in thermal conductivity, as described above, and therefore, even if a single thermistor 6 is provided in the center of the infrared light absorbing member 5, the temperature of the infrared light absorbing member 5 can be properly detected. The thermistor 6 is connected to the controller 9, and outputs the detected temperature to the controller 9.

The retaining member 7 retains the intermediate mirror 41 and the infrared light absorbing member 5. The retaining member 7 retains the intermediate mirror 41 in a state where the intermediate mirror 41 faces the display 3 and the final mirror 42. Moreover, in a state where the intermediate mirror 41 is retained, the retaining member 7 retains the infrared light absorbing member 5 in a state where the infrared light absorbing member 5 is located on the side of the rear face 41*b* of the intermediate mirror 41. The retaining member 7 retains each of the intermediate mirror 41 and the infrared light absorbing member 5 in such a way that the intermediate mirror 41 and the infrared light absorbing member 5 are spaced apart from each other. In other words, the infrared light absorbing member 5 is provided on the side of the rear face 41*b* of the intermediate mirror 41 to be spaced apart from the rear face 41*b* in a state where the infrared light absorbing member 5 is retained by the retaining member 7. The retaining member 7 retains the intermediate mirror 41 and the infrared light absorbing member 5 in such a way that the intermediate mirror 41 and the infrared light absorbing member 5 are superimposed onto each other in a direction where the sunlight Ls enters the intermediate mirror 41.

The controller 9 controls the display 3 and the mirror driving unit 43. The controller 9 includes an electronic circuit that principally includes a known microcomputer including a CPU, a ROM or a RAM that constitutes a storage, and an interface. The controller 9 performs control to avoid an increase in temperature of the TFT 31 on the basis of a detected temperature that has been detected by the thermistor 6. For example, in a case where the detected temperature that has been output from the thermistor 6 is higher than or equal to a predetermined reference temperature, the controller 9 controls the back light 32, and relatively reduces an amount of light to be applied from the back light 32. Then, in a case where the detected temperature that has been output from the thermistor 6 is higher than or equal to the reference temperature even if an amount of light to be applied from the back light 32 has been reduced, the controller 9 turns off the back light 32. Moreover, in a case where the detected temperature that has been output from the thermistor 6 is higher than or equal to the reference temperature even if the back light 32 has been turned off, the controller 9 controls the mirror driving unit 43 to rotationally move the final mirror 42, and performs control in such a way that the sunlight Ls does not enter the TFT 31. On the other hand, in a case where the detected temperature that has been output from the thermistor 6 is lower than the reference temperature, the controller 9 maintains an amount of light to be applied from the back light 32. Note that the controller 9, the mirror driving unit 43, and the back light 32 constitute a processor that can perform processing for avoiding an increase in temperature of the TFT 31 on the basis of the temperature detected by the thermistor 6.

Figure 2:
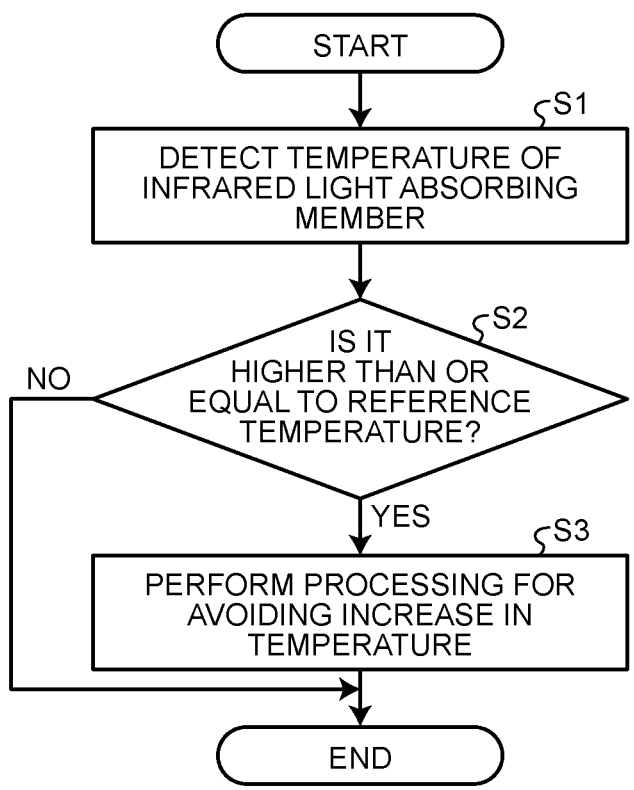
FIG. 2 is a flowchart illustrating an example of an operation of the display device for the vehicle according to the embodiment.

Next, an example of an operation of the display device for the vehicle 1 is described. FIG. 2 is a flowchart illustrating an example of the operation of the display device for the vehicle 1 according to the embodiment. The display device for the vehicle 1 detects the temperature of the infrared light absorbing member 5 by using the thermistor 6, as illustrated in FIG. 2 (Step S1). The thermistor 6 outputs the detected temperature to the controller 9. Next, the display device for the vehicle 1 causes the controller 9 to determine whether the detected temperature that has been output from the thermistor 6 is higher than or equal to the reference temperature (Step S2). In a case where the detected temperature that has been output from the thermistor 6 is higher than or equal to the reference temperature (Step S2: Yes), the controller 9 performs processing for avoiding an increase in temperature of the TFT 31 (Step S3). The controller 9 performs, for example, processing for relatively reducing an amount of light to be applied from the back light 32. In Step S2 described above, in a case where the detected temperature that has been output from the thermistor 6 is lower than the reference temperature (Step S2: No), the controller 9 maintains an amount of light to be applied from the back light 32, and terminates the processing.

As described above, the display device for the vehicle 1 according to the embodiment includes the housing 2 that is provided in the vehicle 100, the TFT 31 that is housed in the housing 2, the intermediate mirror 41, the infrared light absorbing member 5, and the thermistor 6. The intermediate mirror 41 is housed in the housing 2, reflects, on the reflecting surface 41*a*, the display light Lt that has been output from the TFT 31 in such a way that the display light Lt reaches the visual observation position EP of the driver of the vehicle 100, and transmits the infrared light L1 included in the sunlight Ls without reflecting the infrared light L1 on the reflecting surface 41*a*. The infrared light absorbing member 5 is provided on a side of the rear face 41*b* that is opposite to the reflecting surface 41*a* of the intermediate mirror 41, and absorbs the infrared light L1 that has been transmitted through the intermediate mirror 41. The thermistor 6 is provided to the infrared light absorbing member 5, and detects the temperature of the infrared light absorbing member 5.

Here, a display device for a vehicle in a comparative example detects infrared light that has been transmitted through a cold mirror by using, for example, an infrared sensor in some cases. In these cases, it is requested that the infrared sensor be disposed in a portion where the infrared light condenses to be spaced apart from a rear face of the cold mirror, and therefore there is a possibility of a larger size of the apparatus. On the other hand, in the display device for the vehicle in the comparative example, in a case where the infrared sensor is disposed to be close to the rear face of the cold mirror, it is requested that a plurality of infrared sensors be disposed, and therefore there is a possibility of an increase in the number of infrared sensors.

In contrast, the display device for the vehicle 1 according to the embodiment detects the temperature of the infrared light absorbing member 5 by using the thermistor 6, and therefore a distance between the intermediate mirror 41 and the thermistor 6 can be reduced in comparison with a case where the infrared sensor is used, and this can avoid an increase in size of the apparatus. Furthermore, the display device for the vehicle 1 can avoid an increase in the number of thermistors 6 in comparison with a case where the infrared sensor is used. Therefore, the display device for the vehicle 1 can properly detect an increase in temperature of the TFT 31 due to the sunlight Ls.

The display device for the vehicle 1 includes the retaining member 7 that retains the intermediate mirror 41 and the infrared light absorbing member 5. The infrared light absorbing member 5 is provided on a side of the rear face 41*b* of the intermediate mirror 41 to be spaced apart from the rear face 41*b* in a state where the infrared light absorbing member 5 is retained by the retaining member 7. The thermistor 6 is provided on the reverse face 5*b* that is opposite to a side of the intermediate mirror 41 in the infrared light absorbing member 5. By doing this, in the display device for the vehicle 1, the infrared light absorbing member 5 can be properly disposed on a side of the rear face 41b of the intermediate mirror 41.

The display device for the vehicle 1 includes the processor that can perform processing for avoiding an increase in temperature of the TFT 31 on the basis of the temperature detected by the thermistor 6. In this example, the processor is constituted by the controller 9, the mirror driving unit 43, and the back light 32. For example, in a case where the detected temperature that has been output from the thermistor 6 is higher than or equal to a reference temperature, the display device for the vehicle 1 can avoid an increase in temperature of the TFT 31 by relatively reducing an amount of light to be applied from the back light 32.

Next, variations of the embodiment are described. Note that in the variations, a component that is similar to a component in the embodiment is denoted by the same reference sign, and the detailed description thereof is omitted.

Figure 3:
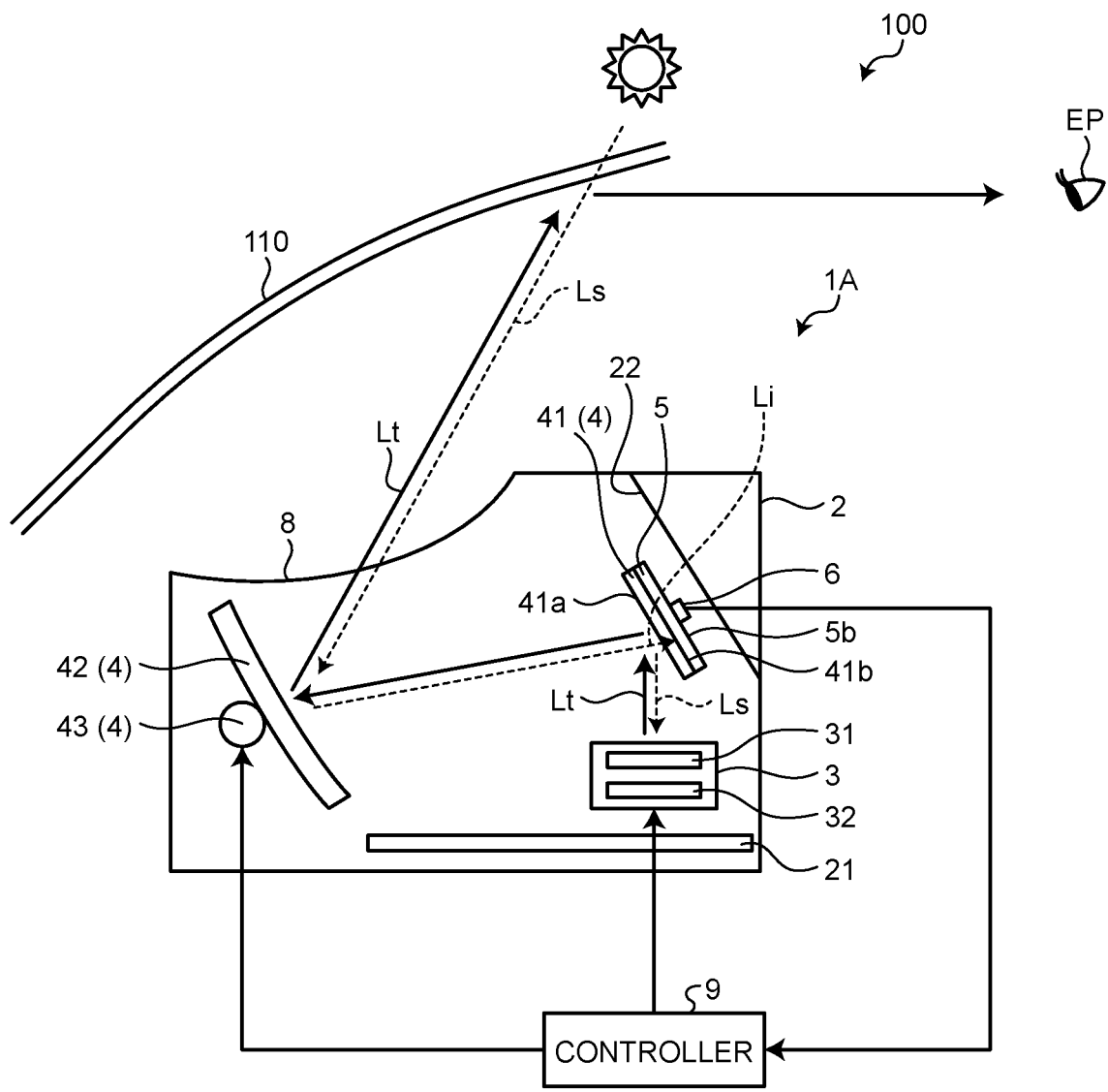
FIG. 3 is a diagram illustrating a configuration example of a display device for a vehicle according to a first variation of the embodiment.

FIG. 3 is a diagram illustrating a configuration example of a display device for a vehicle 1A according to a first variation of the embodiment. The display device for the vehicle 1A according to the first variation is different from the display device for the vehicle 1 according to the embodiment in that the infrared light absorbing member 5 is provided to be in close contact with the rear face 41b of the intermediate mirror 41.

The infrared light absorbing member 5 is provided, for example, by being stuck on the rear face 41b of the intermediate mirror 41 by using an adhesive. A single thermistor 6 is provided in a center to be in contact with the reverse face 5b that is opposite to a side of the intermediate mirror 41 in the infrared light absorbing member 5. By employing this configuration, the display device for the vehicle 1A according to the first variation can avoid an increase in the number of parts and can be reduced in size in comparison with the display device for the vehicle 1 according to the embodiment.

Figure 4:
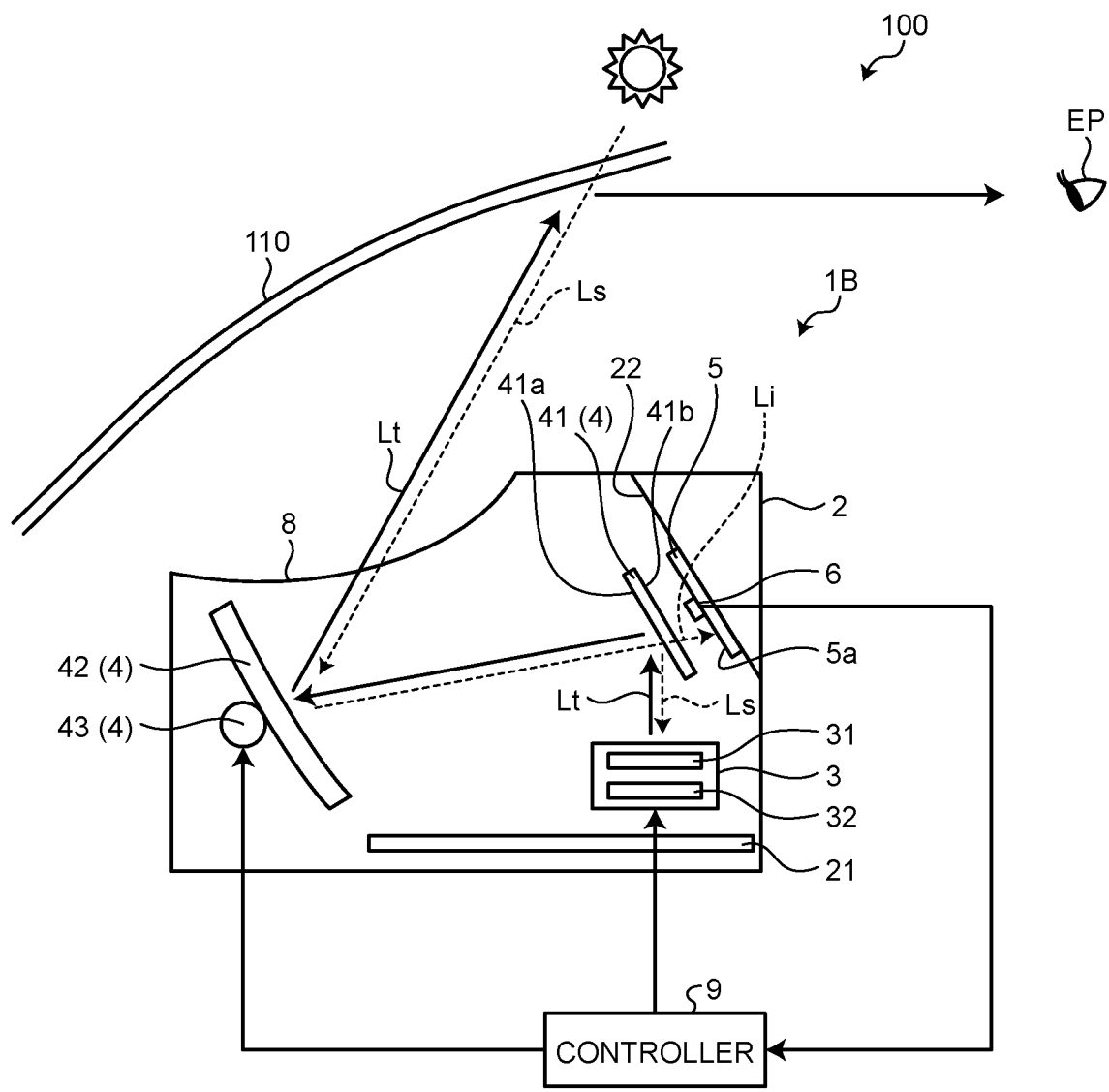
FIG. 4 is a diagram illustrating a configuration example of a display device for a vehicle according to a second variation of the embodiment.

FIG. 4 is a diagram illustrating a configuration example of a display device for a vehicle 1B according to a second variation of the embodiment. The display device for the vehicle 1B according to the second variation is different from the display device for the vehicle 1 according to the embodiment in that the infrared light absorbing member 5 is provided on an inner face 22 of the housing 2.

The infrared light absorbing member 5 is provided, for example, on the inner face 22 of the housing 2 that is disposed to face the rear face 41b of the intermediate mirror 41. Specifically, the infrared light absorbing member 5 is provided on the inner face 22 of the housing 2 in such a way that the intermediate mirror 41 and the infrared light absorbing member 5 are superimposed onto each other in a direction where the sunlight Ls enters the intermediate mirror 41. A single thermistor 6 is provided in a center to be in contact with a front face 5a on a side of the intermediate mirror 41 in the infrared light absorbing member 5. By employing this configuration, the display device for the vehicle 1B according to the second variation can avoid an increase in the number of parts and can be reduced in size in comparison with the display device for the vehicle 1 according to the embodiment. Note that in the display device for the vehicle 1B, in a case where the housing 2 is formed by using a material having high thermal conductivity, such as metal, the infrared light absorbing member 5 does not need to be formed by using a graphite sheet or the like that is excellent in thermal conductivity, and can be formed by using a member having the infrared light absorbing function without considering thermal conductivity.

In the description above, an example where the infrared light absorbing member 5 is provided to the intermediate mirror 41 has been described, but this is not restrictive, and the infrared light absorbing member 5 may be provided to another mirror such as the final mirror 42.

An example where the intermediate mirror 41 is a planar mirror has been described, but this is not restrictive, and the intermediate mirror 41 may be, for example, a magnifying mirror, a free curved mirror, or the like.

An example where the final mirror 42 is a magnifying mirror has been described, but this is not restrictive, and the final mirror 42 may be, for example, a free curved mirror, a planar mirror, or the like.

An example where a single thermistor 6 is provided in a center of the infrared light absorbing member 5 has been described, but this is not restrictive, and for example, a plurality of thermistors 6 may be provided to the infrared light absorbing member 5 to be spaced apart from each other.

An example where the processor that can perform processing for avoiding an increase in temperature of the TFT 31 is included has been described, but this is not restrictive, and a configuration where the processor is not included may be employed.

The display device for the vehicle according to the present embodiment detects the temperature of the infrared light absorbing member by using the temperature detector, and therefore an increase in size of the apparatus can be avoided, and an increase in the number of temperature detectors can also be avoided. Therefore, the display device for the vehicle can properly detect an increase in temperature of the liquid crystal display element due to sunlight.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, comprising:
    a housing that is provided in the vehicle;
    a liquid crystal display element that is housed in the housing;
    a mirror that is housed in the housing, reflects, on a reflecting surface, display light that has been output from the liquid crystal display element to cause the display light to reach a visual observation position of a driver of the vehicle, and transmits infrared light included in sunlight without reflecting the infrared light on the reflecting surface;
    an infrared light absorbing member that is provided on a side of a rear face of the mirror, the rear face being opposite to the reflecting surface, and absorbs the infrared light that has been transmitted through the mirror; and
    a temperature detector that is provided to the infrared light absorbing member, and detects a temperature of the infrared light absorbing member.

2. The display device for the vehicle according to claim 1, further comprising:
    a retaining member that retains the mirror and the infrared light absorbing member, wherein
    the infrared light absorbing member is provided on the side of the rear face of the mirror to be spaced apart from the rear face in a state where the infrared light absorbing member is retained by the retaining member, and the temperature detector is provided on a reverse face of the infrared light absorbing member, the reverse face being opposite to a side of the mirror.

3. The display device for the vehicle according to claim 2, further comprising:

a processor that is able to perform processing for avoiding an increase in temperature of the liquid crystal display element on a basis of the temperature that has been detected by the temperature detector.

4. The display device for the vehicle according to claim 1, wherein the infrared light absorbing member is provided to be in close contact with the rear face of the mirror, and the temperature detector is provided on a reverse face of the infrared light absorbing member, the reverse face being opposite to a side of the mirror.

5. The display device for the vehicle according to claim 4, further comprising:

a processor that is able to perform processing for avoiding an increase in temperature of the liquid crystal display element on a basis of the temperature that has been detected by the temperature detector.

6. The display device for the vehicle according to claim 1, wherein the infrared light absorbing member is provided on an inner face of the housing that is disposed to face the rear face of the mirror, and the temperature detector is provided on a front face of the infrared light absorbing member, the front face being located on a side of the mirror.

7. The display device for the vehicle according to claim 6, further comprising:

a processor that is able to perform processing for avoiding an increase in temperature of the liquid crystal display element on a basis of the temperature that has been detected by the temperature detector.

8. The display device for the vehicle according to claim 1, further comprising:

a processor that is able to perform processing for avoiding an increase in temperature of the liquid crystal display element on a basis of the temperature that has been detected by the temperature detector.

* * * * *